(12) United States Patent
Nishio et al.

(10) Patent No.: US 6,349,348 B1
(45) Date of Patent: Feb. 19, 2002

(54) DATA TRANSFER METHOD AND APPARATUS

(75) Inventors: Tsuyoshi Nishio; Shinji Aoki, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/251,123

(22) Filed: Feb. 16, 1999

(30) Foreign Application Priority Data

Feb. 17, 1998 (JP) ............................. 10-034669
Aug. 17, 1998 (JP) ............................. 10-230738

(51) Int. Cl.⁷ ............................................. G06F 13/00
(52) U.S. Cl. ........................................ 710/34; 710/29
(58) Field of Search ............................ 710/34, 29–35, 710/72–74; 711/112; 360/31, 48, 55; 369/56; 341/41, 67, 106

(56) References Cited

U.S. PATENT DOCUMENTS

| | | | | |
|---|---|---|---|---|
| 5,302,949 A | * | 4/1994 | Yoshinari | 341/67 |
| 5,488,367 A | * | 1/1996 | Kitamura | 341/106 |
| 5,581,790 A | * | 12/1996 | Sefidvash | 710/34 |
| 5,715,452 A | * | 2/1998 | Mori et al. | 707/201 |
| 5,841,598 A | * | 11/1998 | Horiuchi et al. | 360/31 |
| 5,845,076 A | * | 12/1998 | Arakawa | 709/203 |
| 5,886,841 A | * | 3/1999 | Kikuchi et al. | 360/48 |
| 5,896,351 A | * | 4/1999 | Misaizu et al. | 369/32 |
| 5,923,661 A | * | 7/1999 | Nemoto et al. | 370/426 |
| 6,148,366 A | * | 11/2000 | Watanabe | 711/112 |
| 6,160,778 A | * | 12/2000 | Ito et al. | 369/54 |
| 6,188,807 B1 | * | 2/2001 | Arakawa | 382/319 |

* cited by examiner

Primary Examiner—Christopher B. Shin
(74) Attorney, Agent, or Firm—Frommer Lawrence & Haug LLP; William S. Frommer

(57) ABSTRACT

In a transfer using the SCSI, data transfer apparatus is disclosed which blocks of different sizes can be collectively transferred while preserving block information. Data of an amount corresponding to a length of the first block from the head is stored and the first block data is subsequently stored. When a data size is smaller than a specified size, the zero-padding is performed. Further, the data corresponding to a length of the second block is subsequently stored and the second block data is stored. When N blocks are transferred, the above processes are similarly repeated until the Nth block data is stored. The total number (N) of blocks which are transferred once is stored after the Nth block data. A plurality of blocks of variable sizes are continuously transferred while preserving block information.

14 Claims, 19 Drawing Sheets

Fig. 6

| bit byte | 7 | 6 | 5 | 4 | 3 | 2 | 1 | 0 |
|---|---|---|---|---|---|---|---|---|
| 0 | OPERATION CODE ||||||||
| 1 | LOGIC UNIT NO. ||| (RESERVATION) ||| SILI | FIXED |
| 2 | (MSB) |||||||| 
| 3 | TRANSFER SIZE ||||||||
| 4 | |||||||(LSB) |
| 5 | CONTROL ||||||||

Fig. 7

| bit byte | 7 | 6 | 5 | 4 | 3 | 2 | 1 | 0 |
|---|---|---|---|---|---|---|---|---|
| 0 | (MSB) ||||||||
| 1 | THE NUMBER (N) OF BLOCKS ||||||||
| 2 | ||||||||
| 3 | |||||||(LSB) |
| 4 | (MSB) ||||||||
| 5 | LENGTH OF THE 1st BLOCK ||||||||
| 6 | ||||||||
| 7 | |||||||(LSB) |
| ⋮ | ⋮ ||||||||
| 4N | (MSB) ||||||||
| 4N+1 | LENGTH OF THE Nth BLOCK ||||||||
| 4N+2 | ||||||||
| 4N+3 | |||||||(LSB) |

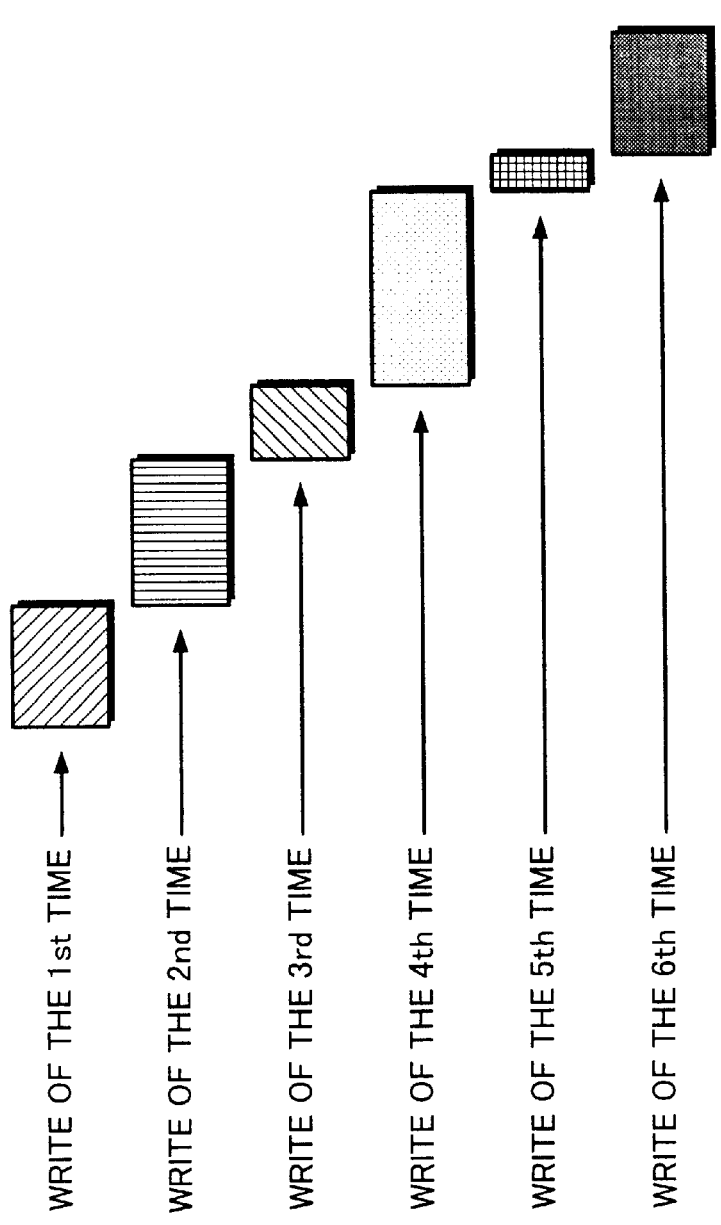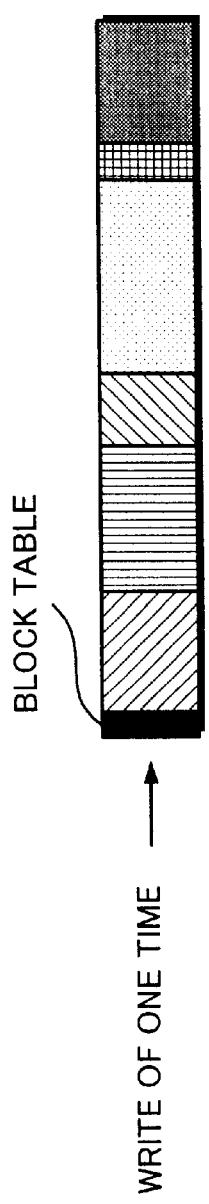
Fig. 9A
Fig. 9B

Fig. 12

| byte \ bit | 7 | 6 | 5 | 4 | 3 | 2 | 1 | 0 |
|---|---|---|---|---|---|---|---|---|
| 0 | (MSB) | | | | | | | |
| 1 | | | | | | | | |
| 2 | | LENGTH OF THE Nth BLOCK | | | | | | |
| 3 | | | | | | | | (LSB) |
| ⋮ | | | ⋮ | | | | | |
| 4N−4 | (MSB) | | | | | | | |
| 4N−3 | | | | | | | | |
| 4N−2 | | LENGTH OF THE Nth BLOCK | | | | | | |
| 4N−1 | | | | | | | | (LSB) |
| 4N | (MSB) | | | | | | | |
| 4N+1 | | | | | | | | |
| 4N+2 | | THE NUMBER (N) OF BLOCKS | | | | | | |
| 4N+3 | | | | | | | | (LSB) |

Fig. 15

| bit / byte | 7 | 6 | 5 | 4 | 3 | 2 | 1 | 0 |
|---|---|---|---|---|---|---|---|---|
| 0 | (MSB) | | | | | | | |
| 1 | | | | | | | | |
| 2 | LENGTH OF THE 1st BLOCK | | | | | | | |
| 3 | | | | | | | | (LSB) |
| 4 ⋮ ⋮ | DATA (1) | | | | | | | |
| ⋮ | (ZERO-PADDING) | | | | | | | |
| ⋮ | ⋮ | | | | | | | |
| ⋮ | (MSB) | | | | | | | |
| ⋮ | LEGTH OF THE Nth BLOCK | | | | | | | |
| ⋮ | | | | | | | | (LSB) |
| ⋮ | DATA (N) | | | | | | | |
| ⋮ | (ZERO-PADDING) | | | | | | | |
| ⋮ | (MSB) | | | | | | | |
| ⋮ | THE NUMBER (N) OF BLOCKS | | | | | | | |
| ⋮ | | | | | | | | (LSB) |

Fig. 19

| bit<br>byte | 7 | 6 | 5 | 4 | 3 | 2 | 1 | 0 |
|---|---|---|---|---|---|---|---|---|
| 0 | (MSB) | | | | | | | |
| 1 | | THE NUMBER (N) OF BLOCKS | | | | | | |
| 2 | | | | | | | | |
| 3 | | | | | | | | (LSB) |
| 4 | (MSB) | | | ATTRIBUTE | | | | (LSB) |
| 5 | (MSB) | | | | | | | |
| 6 | | LENGTH OF THE 1st BLOCK | | | | | | |
| 7 | | | | | | | | (LSB) |
| ⋮ | | | | ⋮ | | | | |
| 4N | (MSB) | | | ATTRIBUTE | | | | (LSB) |
| 4N+1 | (MSB) | | | | | | | |
| 4N+2 | | LENGTH OF THE Nth BLOCK | | | | | | |
| 4N+3 | | | | | | | | (LSB) |

Fig. 20

| bit<br>byte | 7 | 6 | 5 | 4 | 3 | 2 | 1 | 0 |
|---|---|---|---|---|---|---|---|---|
| 0 | (MSB) | | | ATTRIBUTE | | | | (LSB) |
| 1 | (MSB) | | | | | | | (LSB) |
| 2 | | | | LENGTH OF THE 1st BLOCK | | | | |
| 3 | | | | | | | | |
| 4 | | | | | | | | |
| ⋮ | | | | DATA (1) | | | | |
| | | | | | | | | |
| ⋮ | | | | (ZERO-PADDING) | | | | |
| ⋮ | (MSB) | | | ATTRIBUTE | | | | (LSB) |
| ⋮ | (MSB) | | | | | | | |
| ⋮ | | | | LENGTH OF THE Nth BLOCK | | | | |
| ⋮ | | | | | | | | (LSB) |
| ⋮ | | | | DATA (N) | | | | |
| ⋮ | | | | (ZERO-PADDING) | | | | |
| ⋮ | (MSB) | | | | | | | |
| ⋮ | | | | THE NUMBER (N) OF BLOCKS | | | | |
| ⋮ | | | | | | | | (LSB) |

DATA TRANSFER METHOD AND APPARATUS

BACKGROUND OF THE INVENTION

1, Field of the Invention

The invention relates to data transfer method and apparatus which are suitable for use in a tape streamer such that data of a large capacity is sequentially recorded and in which data whose block size is variable can be read and written at a high speed.

2. Description of the Related Art

In association with an increase in data capacity, as means for storing data of a large capacity, the necessity of a data recording apparatus such that data is recorded onto a magnetic tape is increasing. In a recording medium using such a magnetic tape, different from a recording medium by a disk, data is almost sequentially recorded. Such a recording apparatus is suitable for use in a backup of, for example, a hard disk of a large capacity.

For instance, such a recording apparatus is connected to a computer serving as a host through a predetermined interface. A command indicative of the execution of a data copy is issued from the host to the recording apparatus through the interface. After predetermined transmission and reception based on the connecting interface were performed, data is transferred from the host to the recording apparatus and the data is written to, for example, a magnetic tape by the recording apparatus.

Hitherto, the SCSI (Small Computer System Interface) has mainly been used as an interface to connect the host and the recording apparatus. In the SCSI, apparatuses which are connected to an SCSI bus are classified to an initiator (for example, SCSI board) to issue an SCSI command and a target (for instance, hard disk) to receive and execute the SCSI command. Data is transferred between the initiator and the target. In the above example, the SCSI board is connected to the computer and the recording apparatus is used as a target.

In the SCSI, data is handled on a block unit basis. The "block" is a collection having a predetermined size of data and a file is constructed by collecting a plurality of blocks. The block of an arbitrary size is formed on the host side which forms a file. The data transfer by the SCSI is executed on a block unit basis in order to preserve block information.

Although a mode to collect a plurality of blocks into one block and transfer it is also prepared for the SCSI, in this mode, it is necessary that sizes of blocks to be collectively transferred are equal. In this case, a plurality of blocks can be transferred by one command. However, when the sizes of blocks to be transferred are different, there is a problem such that only one block can be transferred by the transfer of once, namely, by one command which is issued from the initiator.

To transfer once, besides the transfer time to transfer the data main body, the time for occupying (arbitration) the bus and the time for receiving and transmitting a command are necessary. Those periods of time become an overhead for the transfer time of the data main body.

When the block size is relatively large, the overhead time does not become a large problem. When the size of block to be transferred is small, however, the overhead time which is expended every block cannot be ignored and there is a problem such that a transfer speed decreases as a whole.

SUMMARY OF THE INVENTION

It is, therefore, an object of the invention to provide a data transfer method and apparatus which can collectively transfer blocks of different sizes.

To solve the foregoing problems, according to the invention, there are provided data transfer method and apparatus for transferring digital data whose block sizes are variable, characterized in that when a plurality of data blocks having different block sizes are transferred by one command to instruct the transfer, block information of a plurality of data blocks is transferred together with a plurality of data blocks.

As mentioned above, according to the invention, since the block information of a plurality of data blocks is transferred together with a plurality of data blocks, a plurality of data blocks whose block sizes are variable can be continuously transferred while preserving the block information.

The above, and other, objects, features and advantage of the present invention will become readily apparent from the following detailed description thereof which is to be read in connection with the accompanying drawings.

BRIEF DESCRIPTION OF THE DRAWINGS

FIG. 6 is a schematic diagram showing an example of a structure of WRITE/READ commands;

FIG. 7 is a schematic diagram showing an example of a block table which is formed upon writing;

FIGS. 9A and 9B are schematic diagrams showing states of a data transfer upon writing in comparison with a conventional method;

FIG. 12 is a schematic diagram showing an example of a block table which is formed upon reading;

FIG. 15 is a schematic diagram showing an example of a structure of transfer data according to the second embodiment;

FIG. 19 is a schematic diagram showing a construction of a block table according to the third embodiment; and FIG. 20 is a schematic diagram showing a construction of a table according to the fourth embodiment.

DETAILED DESCRIPTION OF THE PREFERRED EMBODIMENTS

Figure 1:
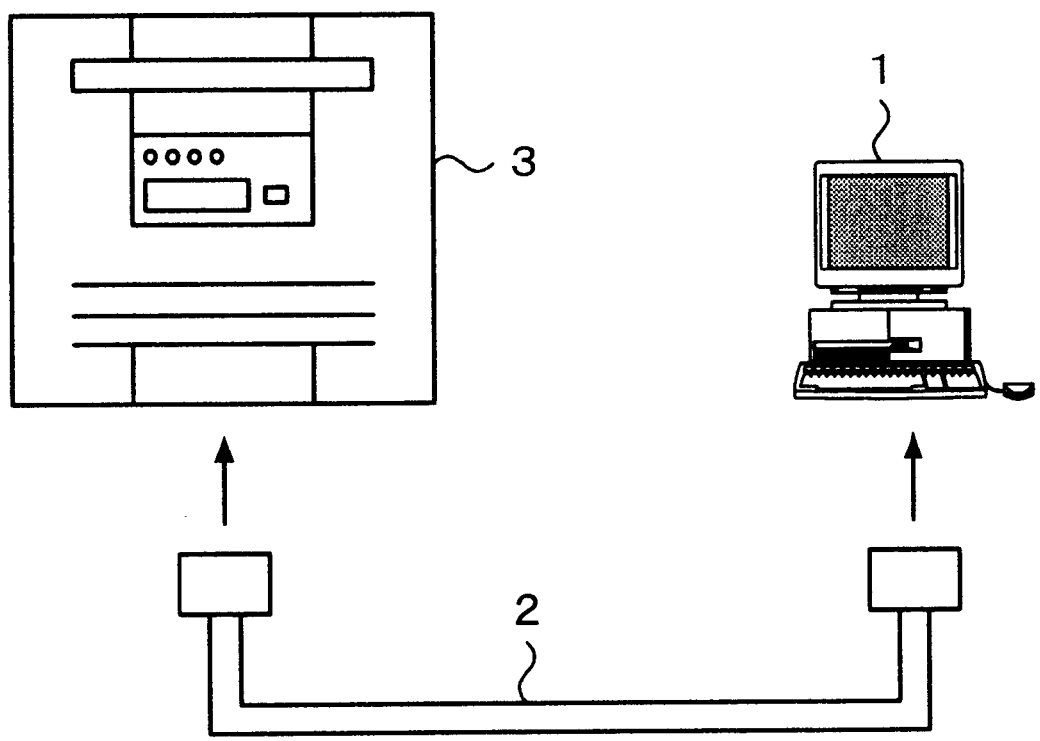
FIG. 1 is a block diagram showing an example of a connection state of each device which is common to the first and second embodiments of the invention.

Embodiments of the invention will now be explained hereinbelow with reference to the drawings. FIG. 1 shows an example of a connecting state of each apparatus which can be commonly applied to the first and second embodiments of the invention. An SCSI board (not shown) is installed in a host computer 1. An SCSI cable 2 is connected to the SCSI board. The host computer 1 and a tape streamer 3 to which the invention is applied are connected by the SCSI cable 2. The tape streamer 3 has a CPU and a memory and executes a recording/reproduction of data on the basis of the control of the CPU by using a magnetic tape enclosed in a cassette as a recording medium.

The SCSI board has, for example, a CPU and issues an SCSI command on the basis of an instruction generated from the host computer 1. In the SCSI board, a control of various phases of a data transfer by instructions of the host computer 1 is executed. Communication based on the SCSI command is made with a destination side (in this case, the tape streamer 3) via the SCSI cable 2 and data is transferred between the host computer 1 and tape streamer 3.

Figures 2A, 2B:
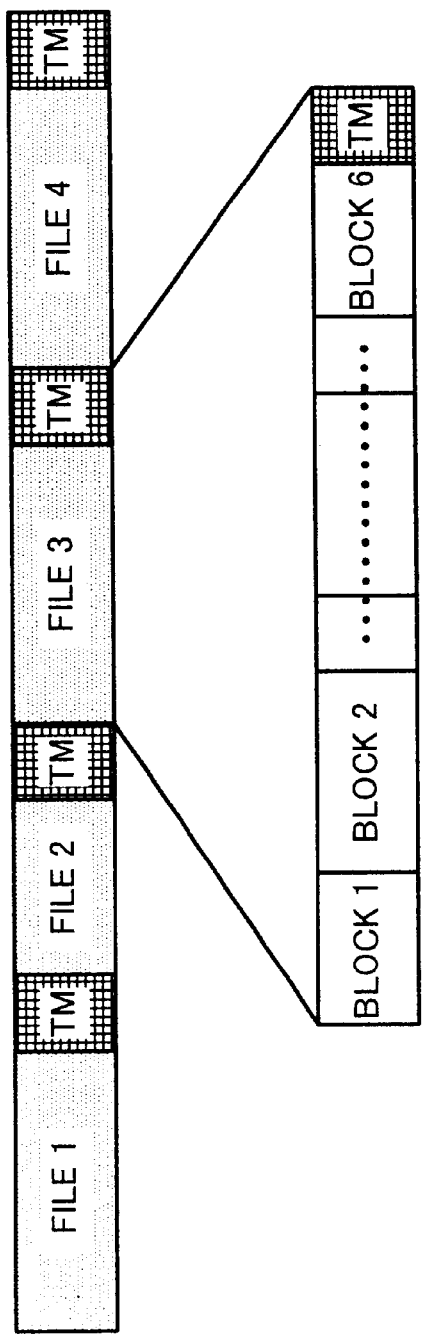
FIGS. 2A and 2B are schematic diagrams conceptually showing an example of a data image on a magnetic tape.

FIGS. 2A and 2B show examples of a data image on a magnetic tape in the tape streamer 3 which can be commonly applied to the first and second embodiments of the invention. As shown in FIG. 2A, data is written onto the tape on a file unit basis. A mark TM as a delimiter code of a file is written at the end of each file. A new file is written after the mark TM. As shown in FIG. 2B, each file comprises one or a plurality of blocks. As for the sizes of the blocks, there is a case where they are different as shown in FIG. 2B and there is also a case where all of them are equalized.

Although not shown, a management table to manage the data written on the tape is provided at the head of the whole tape. When the tape is loaded into the tape streamer 3, a layout of the files or the like on the tape can be referred by reading the management table.

The tape streamer 3 executes the recording to the magnetic tape by a helical scan system. Therefore, helical tracks are formed on the magnetic tape. A track set is formed by four tracks. The writing of data to the magnetic tape is executed on a track set unit basis. An ID to discriminate the track sets from one another is added to each track set. In one track set, an area of sub-code data is arranged on the head side of an area in which a data main body is stored and an ID is written. A block management table to manage a block construction of the data main body is arranged on the end side of the area in which the data main body is stored.

Figure 3:
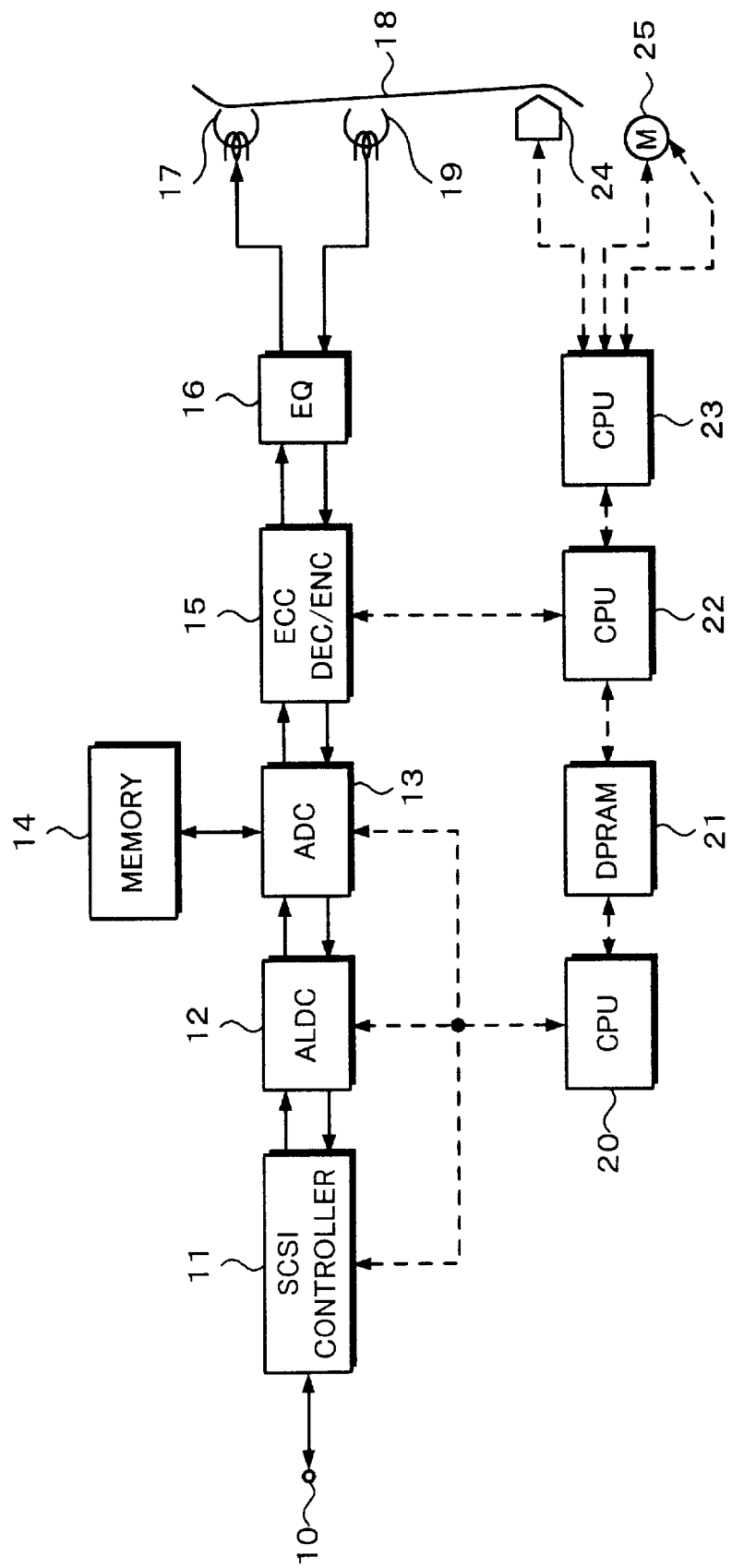
FIG. 3 is a block diagram schematically showing an example of a construction of a tape streamer.

FIG. 3 schematically shows an example of a construction of the tape streamer 3 which can be commonly applied to the first, second, third, and fourth embodiments of the invention. The SCSI cable 2 is connected to an input terminal 10. When data is written, data transferred from the host computer 1 is supplied from the terminal 10 to an SCSI controller 11. In the SCSI controller 11, the SCSI command supplied from the terminal 10 is analyzed or executed and the data main body which is transferred and data associated to it are separated.

The separated data main body is inputted to a data compressing controller ALDC 12 and is compression encoded by a predetermined method and the resultant data is supplied to an address controller ADC 13. The address controller AD 13 executes an address control to a memory 14 and controls the writing and reading operations of the data in the memory 14. For instance, for the memory 14, an address to start an access is designated as a pointer and a size of data which is accessed is also designated by the address controller ADC 13. The data is stored into the memory 14 as images on a magnetic tape 18 on the basis of the control of the address controller ADC 13.

The data is read out from the memory 14 in correspondence to a writing timing on the basis of the control of the address controller 13 and is supplied to an ECC encoder/decoder 15. The ECC encoder/decoder 15 is constructed so as to function as an encoder when data is written and to function as a decoder upon reading. Upon writing, the supplied data is error correction encoded by a product code using, for example, a Reed Solomon code. The error correction encoded data is supplied to an equalizer 16.

The data supplied to the equalizer 16 is converted to a signal suitable for recording to a recording medium and the resultant data is written and recorded as helical tracks onto the magnetic tape 18 by a recording head 17 as a rotary head. In this example, four tracks are recorded as one track set.

Although it is omitted in FIG. 3, the SCSI controller 11, data compressing controller ALDC 12, address controller ADC 13, and equalizer 16 are constructed so as to cope with both of the writing and recording operations in a manner similar to the ECC encoder/decoder 15.

Upon reading, the signal read out from the magnetic tape 18 by a reproducing head 19 as a rotary head is supplied to the ECC encoder/decoder 15 via the equalizer 16. An error correction is performed to the data by the ECC encoder/decoder 15. The resultant data is written into the memory 14 by the control of the address controller ADC 13.

The data written in the memory 14 is read out at a predetermined timing by the control of the address controller ADC 13 and is supplied to the data compressing controller ALDC 12. A compression encoding of the data is released and the resultant data is supplied to the SCSI controller 11. The data is transferred from the terminal 10 to the host computer 1 via the SCSI cable 2 by the control of the SCSI controller 11.

The tape streamer 3 has three CPU 20, 22, and 23. The CPU 20 controls the SCSI controller 11, data compressing controller 12, and address controller ADC 13. The data associated to the main body data and separated from the supplied main body data by the SCSI controller 11 is supplied to the CPU 20.

On the basis of the control of the CPU 20, the data and command are transmitted and received between the SCSI controller 11 and an SCSI board on the host computer 1 side by the SCSI controller 11.

The CPU 22 controls the ECC encoder/decoder 15. A processing result of the ECC encoder/decoder 15 is supplied to the CPU 22. The CPU 23 controls the rotation of a motor 25 by a signal of the tracks formed in the longitudinal direction of the magnetic tape 18 and read out by a fixed head 24, a sense signal of the rotation of the motor 25 to drive the magnetic tape 18, and the like.

A DPRAM 21 which is connected between the CPU 20 and CPU 22 is a dual port RAM and executes communication between the CPU 20 and CPU 22. Although not shown in FIG. 3, the CPU 22 and CPU 23 can also similarly communicate. Although three CPUs 20, 22, and 23 are used here as CPUs, the invention is not limited to this example but can be also constructed by one CPU as a whole or can be also constructed by combining specific two CPUs.

Figure 4:
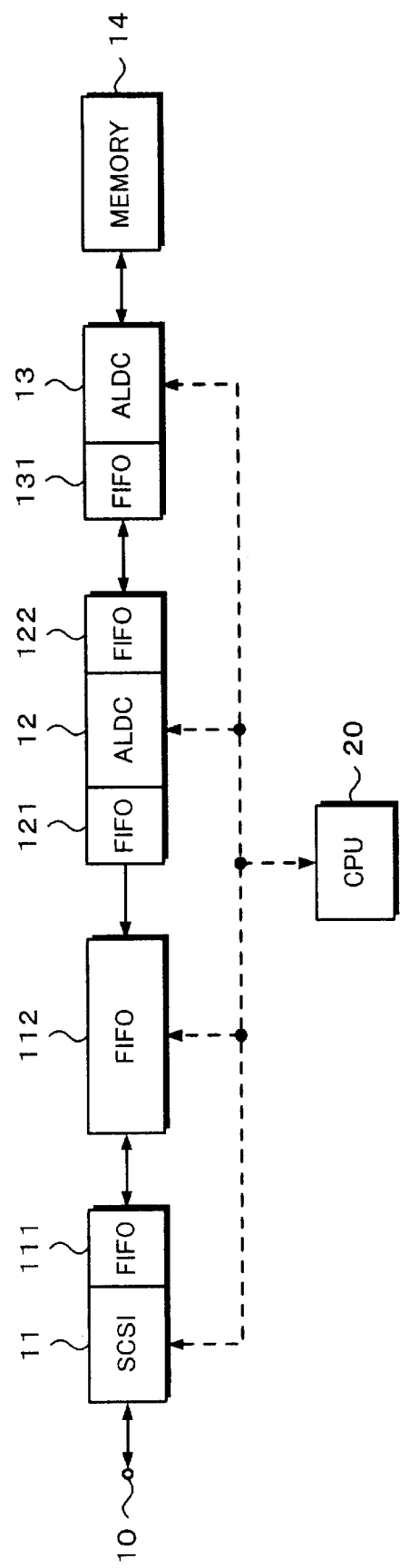
FIG. 4 is a block diagram showing an example of a construction from a terminal to a memory in the construction of the tape streamer.

FIG. 4 shows a portion from the terminal 10 to the memory 14 in the construction in FIG. 3 in more detail. As shown in the diagram, each of the SCSI controller 11, data compressing controller 12, and address controller 13 has an FIFO. That is, the SCSI controller 11 has an FIFO 111 on the side opposite to the terminal 10. The data compressing controller 12 has FIFOs 121 and 122 on both sides. The address controller 13 has an FIFO 131 on the side opposite to the memory 14. An FIFO 112 in which the writing and reading timings are controlled by the CPU 20 is further provided between the SCSI controller 11 and data compressing controller 12.

Figure 5:
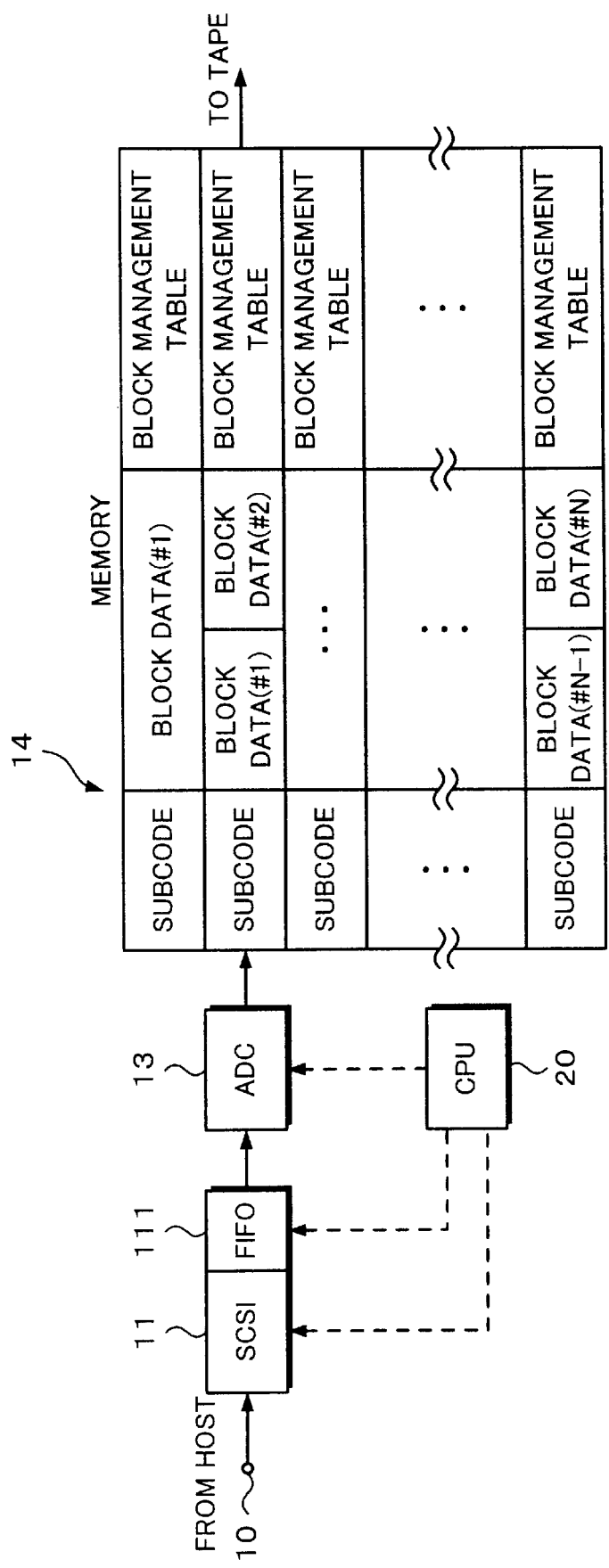
FIG. 5 is block diagram schematically showing a data structure in the memory as a center in the construction of the tape streamer.

FIG. 5 schematically shows the construction of FIG. 3 around the data structure in the memory 14 as a center. As mentioned above, data is stored as writing images to the magnetic tape 18 into the memory 14. The writing to the magnetic tape 18 is executed on the unit basis of the track set comprising four tracks as mentioned above. In the memory 14 as well, addresses are provided by using the track set as a unit and data is written. Data of a plurality of blocks can be included in one track set.

The data is arranged in the memory 14 so that an addressing can be performed every track set. For example, as shown in FIG. 5, one track set is arranged to one row of the addresses in the memory 14. The data is read out from the memory 14 every track set and the data of four tracks is written onto the magnetic tape 18.

When the data is written to, for example, the tape streamer 3, a WRITE command to instruct the tape streamer 3 to write data is transmitted from the host computer 1 through the SCSI board. At the same time, a block table is formed in the host computer 1 and is transferred to the tape streamer 3 via the SCSI board.

The reading of the data from the tape streamer 3 is also executed by using a READ command by a similar process. That is, the READ command is transmitted from the host computer 1 to the tape streamer 3. In the tape streamer 3, the data is read out from the tape on the basis of the command and a block table is formed on the basis of this read data. After the block data was transferred, the block table is transferred.

Those processes in the host computer 1 are located between, for example, the OS (Operation System) and an application and are executed by a device driver for performing a management or the like of peripheral equipment which are connected to the host computer 1. Therefore, on the application side, the processes by the invention can be realized by processes similar to the ordinary file writing and reading operations without being aware of those processes. The invention is not limited to them but the processes can be also directly executed in the application.

FIG. 6 shows an example of a structure of the WRITE command and a READ command, which will be explained hereinlater. The command is constructed by six bytes and the first byte is set to an operation code. The kind of command is discriminated by a value which is stored in the operation code. In this example, the WRITE command is shown by "0Ah" (h denotes a hexadecimal notation). The READ command is shown by "08h". Various parameters such as a logic unit number and the like are stored into the next byte. Subsequent three bytes show a size (total transfer length) of data to be transferred. Last one byte shows a control code. The WRITE/READ commands are also commonly used with respect to the first and second embodiments.

The first embodiment of the invention will now be described. In the invention, the blocks of different sizes can be collectively transferred. In the first embodiment, a block table in which each block size or the like has been written is added to a plurality of blocks which are collectively transferred at once.

FIG. 7 shows an example of the block table which is formed upon writing. As mentioned above, the number (N) of blocks to be transferred to the first four bytes is stored into the block table upon writing and lengths of blocks are sequentially stored every four bytes in accordance with the transferring order of the blocks.

Figure 8:
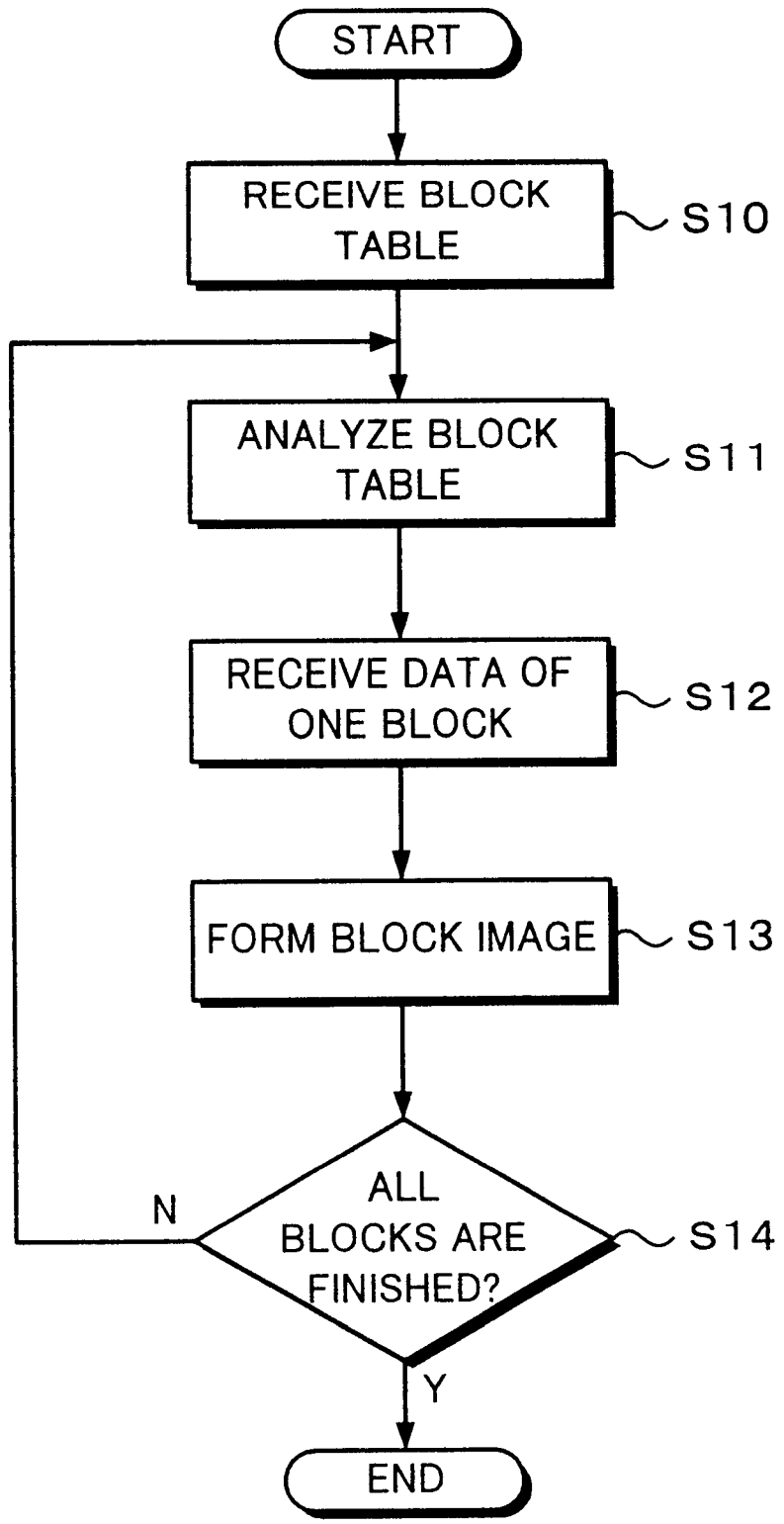
FIG. 8 is a flowchart schematically showing processes when data is recorded to the tape streamer.

FIG. 8 is a flowchart schematically showing processes upon recording of the data to the tape streamer 3. The transferred block table is received to the tape streamer 3 (step S10). In the tape streamer 3, the received block table is analyzed (step S11) and, after that, the data as much as the first one block is received (step S12). In step S13, a block image is formed. The data is written to the magnetic tape by the formed block image. The processing routine is returned to step S11 and the processes of the next one block are executed. When all of the processes are finished (step S14) with regard to the block table received in step S10, the apparatus waits for the reception of, for instance, the next block table.

FIGS. 9A and 9B show states of data transfer which is executed as mentioned above in comparison with the conventional method. FIG. 9A shows an example in which a plurality of data blocks of different sizes are transferred and written by the conventional method. Hitherto, it is necessary to issue the WRITE command every block of a different size as mentioned above. According to the method of the invention shown in FIG. 9B, when a plurality of data blocks are transferred, the WRITE command is sent only once and, after that, the block table is transferred. On the basis of the block table, the data blocks are transferred one by one.

Figures 10A, 10B:
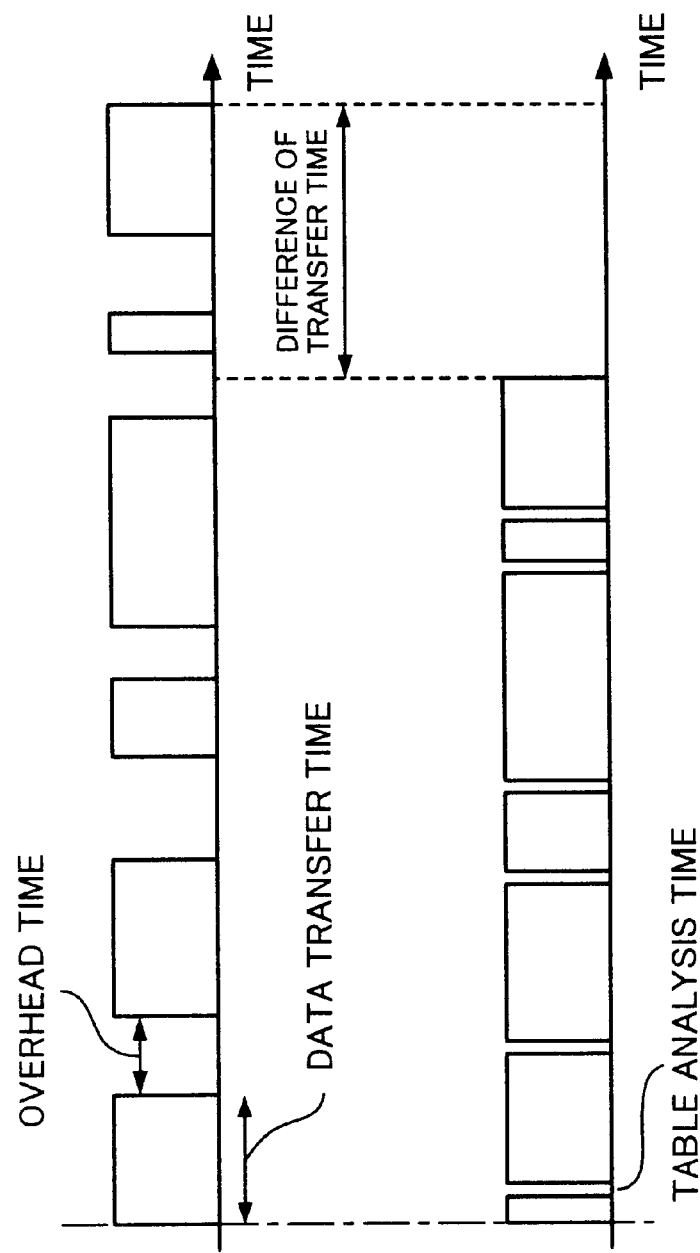
FIGS. 10A and 10B are schematic diagrams for explaining that a transfer time is reduced by a method according to the first embodiment.

By using the method of first transferring the block table and, after that, transferring the blocks as mentioned above, the time that is required to transfer the data can be remarkably reduced rather than that by the conventional method of issuing the WRITE command every block. According to the conventional method, as shown in an example in FIG. 10A, an overhead time is required for each command which is issued every block. That is, a predetermined overhead time is expended for a period of time from the transfer of one block to the transfer of the next block.

On the other hand, according to the method of the invention, the block table is transferred by the first one WRITE command and the blocks are continuously transferred in accordance with the contents of the block table. Therefore, as shown in an example in FIG. 10B, an analyzing time of the block table is merely expended for a period of time of transfer of each block. Even in case of transferring the same block as that in the example of FIG. 10A, consequently, the transfer time is extremely reduced.

Figure 11:
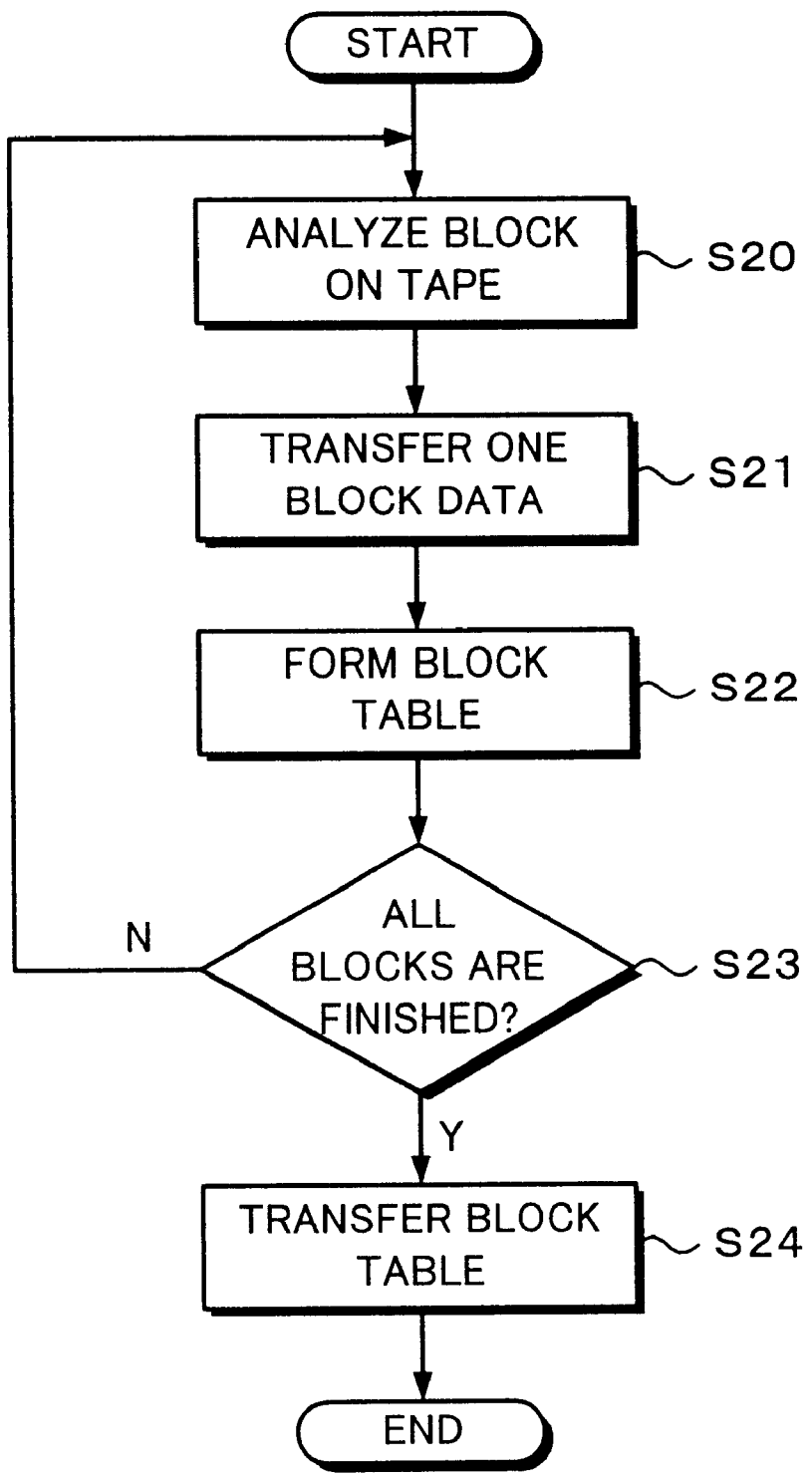
FIG. 11 is a flowchart schematically showing processes when the data is read out from the tape streamer.

FIG. 11 is a flowchart schematically showing processes upon reading of the data from the tape streamer 3. When the data is read out from the tape streamer 3, the READ command to instruct the tape streamer 3 to read out the data is sent from the host computer 1 through the SCSI board.

In the tape streamer 3, the data on the magnetic tape is read out on the basis of the received READ command. The read-out data is once stored into the memory and the block of the data is analyzed (step S20). In next step S21, only one block among the analyzed blocks is transferred to the SCSI board of the host computer 1. In the tape streamer 3, for example, a block table regarding the transferred data block is formed in the memory (step S22).

FIG. 12 shows an example of the block table which is formed upon reading. In a manner similar to the foregoing block table upon writing, in the block table upon reading, the lengths of blocks are sequentially stored every four bytes from the head of the table in accordance with the transferring order of the blocks. That is, the length data of the blocks which were read and transferred is sequentially stacked. When the lengths of all blocks to be transferred are stored, the number (N) of blocks to be transferred is subsequently expressed by four bytes and stored.

The processes in steps S20 to S22 are repeated until all of the data instructed by the READ command is transferred. After completion of the data transfer (step S23), the block table including all of the block information of the transferred data formed in step S22 is transferred from the tape streamer 3 to the SCSI board of the host computer 1 (step S24).

Figure 13:
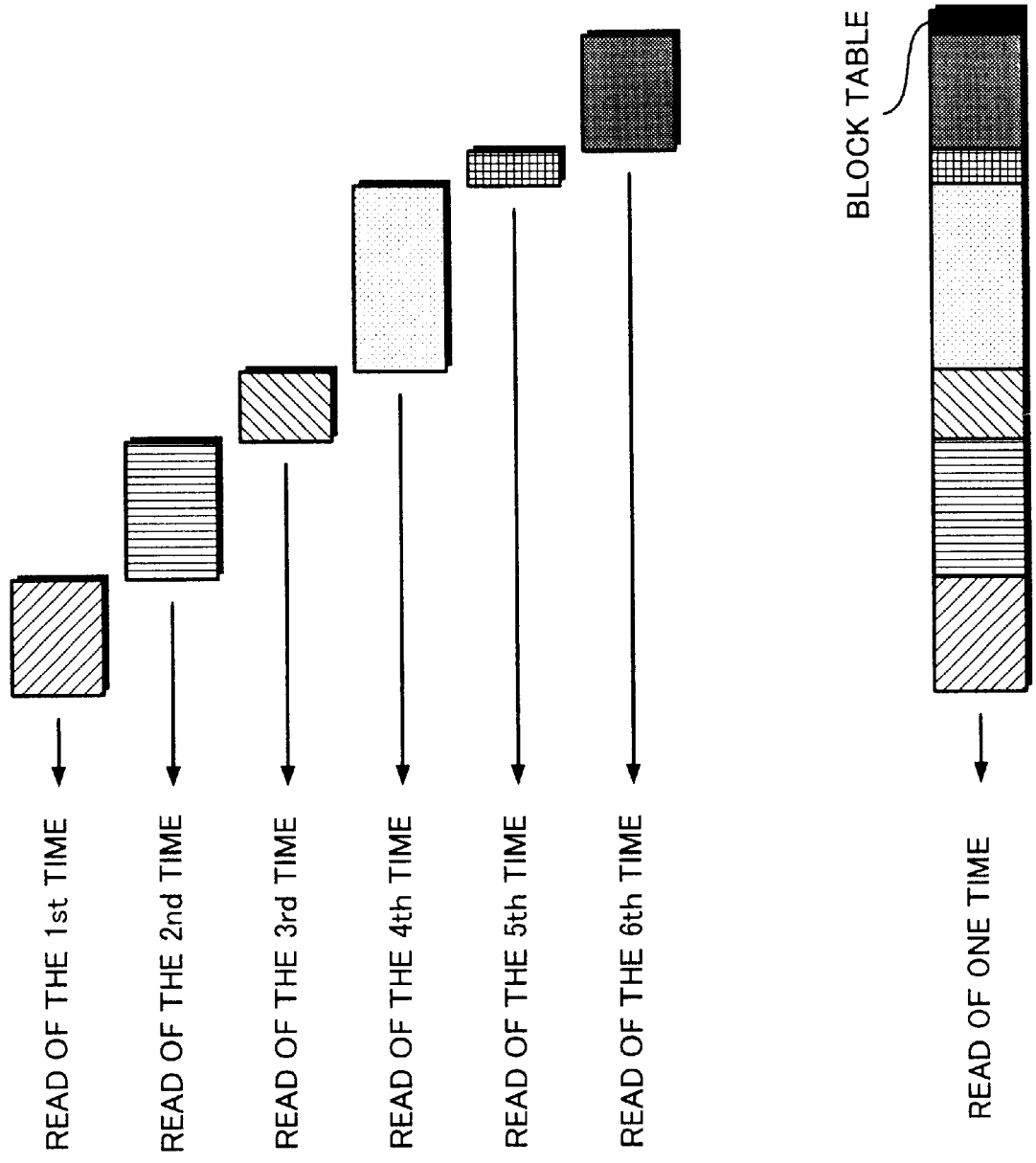
FIGS. 13A and 13B are schematic diagrams showing a state of data transfer upon reading in comparison with the conventional method.

FIGS. 13A and 13B show states of data transfer which is executed as mentioned above in comparison with the conventional method. FIG. 13A shows an example in which a plurality of data blocks of different sizes are read and transferred by the conventional method. When the block sizes are different, hitherto, only one data block can be read out by one READ command as mentioned above. According to the method of the invention shown in FIG. 13B, a plurality of data blocks are transferred by one READ command and, after that, the block table is transferred. On the side which received the data, a data structure can be analyzed with reference to the transferred block table.

Figure 14:
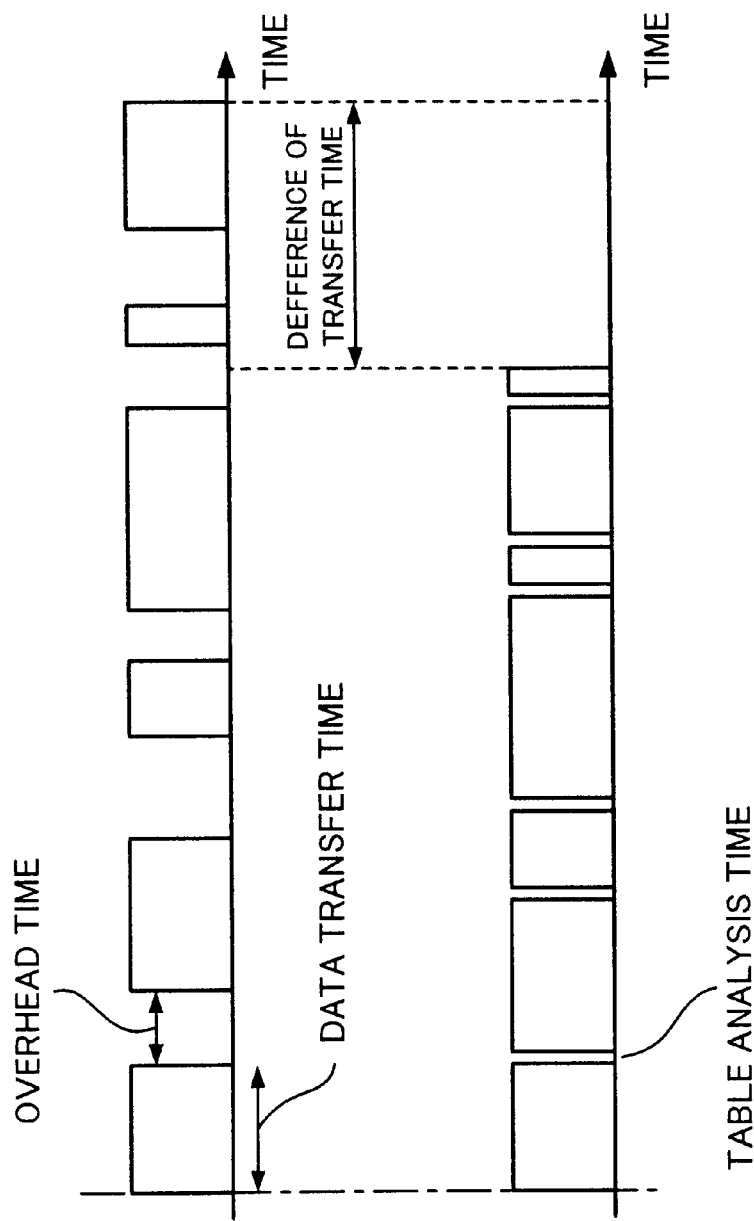
FIGS. 14A and 14B are schematic diagrams for explaining that the transfer time is reduced by the method according to the first embodiment.

By transferring the block table formed by analyzing the blocks of the data read out from the tape as mentioned above, the time that is required for data transfer can be remarkably reduced as compared with that by the conventional method of issuing the READ command every block. According to the conventional method, as shown in an example in FIG. 14A, the overhead time is required for each command that is issued every block. That is, a predetermined overhead time is expended for a period of time from the transfer of one block to the transfer of the next block.

On the other hand, according to the method of the invention, the blocks are continuously transferred by the first one READ command and the block table in which the information of each block is stored is finally transferred. Therefore, as shown in an example in FIG. 14B, the analyzing time of the block table is merely expended for each block transfer period of time. Therefore, even in case of transferring the same blocks as the example of FIG. 14A, the transfer time is remarkably reduced.

By transferring by using the block table as mentioned above, the remarkable reduction of the transfer time can be realized. That is, actually, the block table has a size that is extremely smaller than that of the data main body which is transferred and the block analysis is performed by a simple calculation in the CPU, so that the time which is required for block analysis can be ignored for the transfer time of the data. As compared with such a time, the time that is expended by the overhead according to the conventional method is long because it includes the time which is required for a control of the bus or the like and the like. Strictly speaking, Transfer time of the block table +
(analyzing time of the block table×N)
<overhead time×(N+1)

Under such conditions, the transfer time according to the invention has a superiority.

The second embodiment of the invention will now be described. In the foregoing first embodiment, the formats of the block table upon writing of the data to the tape streamer 3 and that upon reading differ. In the second embodiment, by equalizing the data formats upon writing and reading, the processes can be more easily performed.

FIG. 15 shows an example of a structure of transfer data according to the second embodiment. It is now assumed that N blocks are collectively transferred. A length of block which is transferred for the first time is stored into head four bytes. Subsequently, the data main body of the first block is stored. The end of block is filled with "0" and a zero-padding is executed so as to complete the block on a 4-byte unit basis.

A set comprising the data of the block length and the data (and zero-padding) of the block main body is repeated by only the number of blocks to be transferred. In this example in which N blocks are transferred, such a set is repeated until the data main body of the Nth block is stored. When all of the blocks which are transferred are stored, the number (N) of transfer blocks is stored into the last four bytes.

Figure 16:
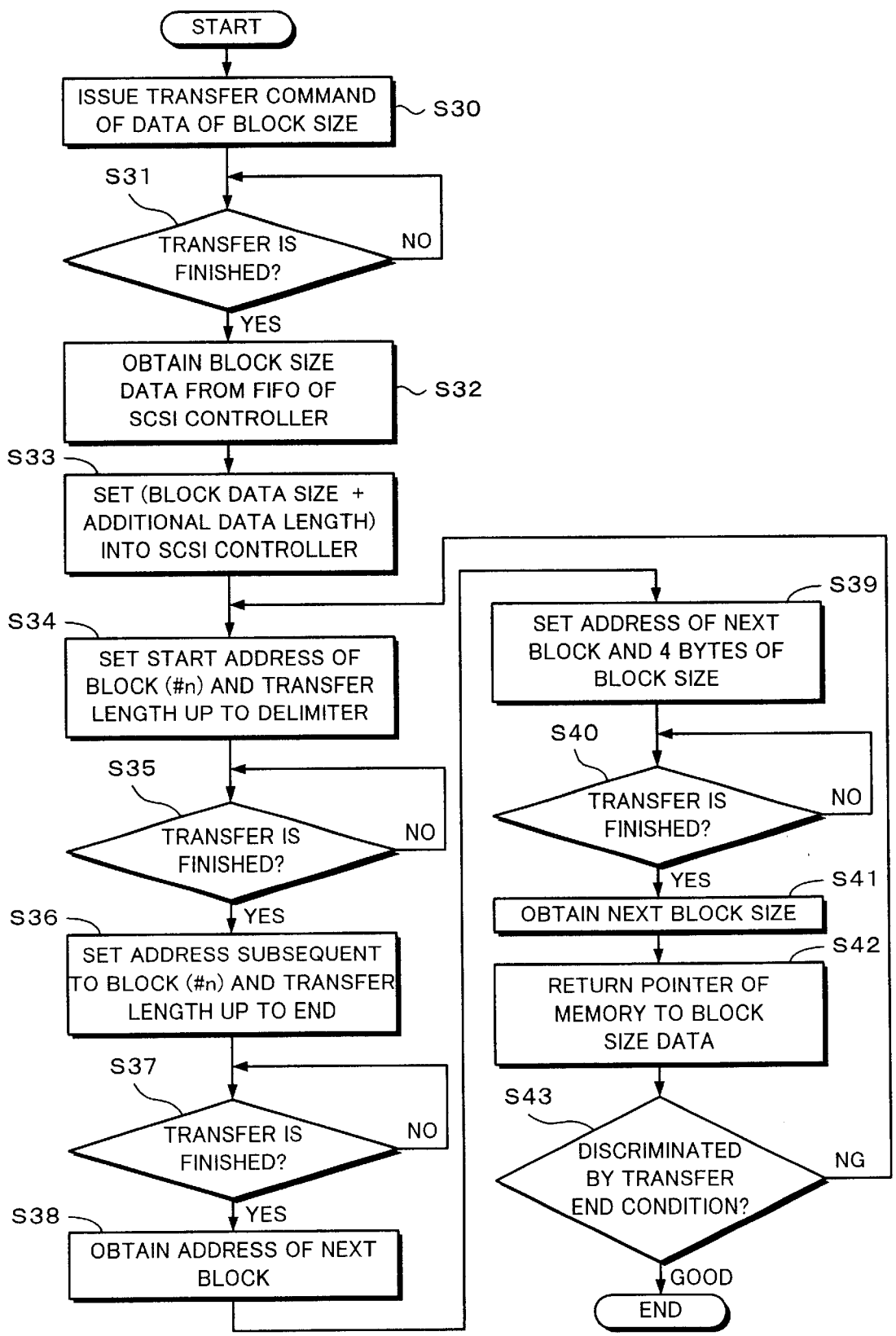
FIG. 16 is a flowchart showing a data writing process to the tape streamer according to the second embodiment.

FIG. 16 is a flowchart showing a data writing process in the tape streamer 3 according to the second embodiment based on such a data structure. Prior to executing the flowchart, in the host computer 1, data to be written into the tape streamer 3 is prepared as a file and, for instance, a copy of the file to the tape streamer 3 is instructed. On the basis of this instruction, the WRITE command is issued from the host computer 1. The issued WRITE command is transferred to the SCSI controller 11 of the tape streamer 3 through the SCSI cable 2 and is sent from the SCSI controller 11 to the CPU 20.

In first step S30, a transfer command of data as much as four bytes is issued from the CPU 20 to the SCSI controller 11. The data of four bytes is block size data showing a size of block to be transferred. This data is stored into the built-in FIFO 111 of the SCSI controller 11. In step S31, when a transfer end notification is issued from the SCSI controller 11 to the CPU 20, the block size data stored in the FIFO 111 is derived by the CPU 20 in next step S32.

When the block size data is derived, in step S33, an additional data length is added to the obtained block data size, thereby setting a transfer length indicative of the length of data which is transferred. The additional data length is constructed by a padding size as a size of zero-padding and four bytes of the next block size data. The transfer length is set into the built-in FIFO 111 of the SCSI controller 11.

In next step S34, a start address of the block (assumes #n) to be transferred on the memory 14 and a transfer length to the delimiter of the block #n are set into the address controller ADC 13 by the CPU 20. A transfer start command is issued from the CPU 20.

As for the start address, for example, assuming that the block #n is a block which is first transferred, a predetermined address in the memory is set to the start address. When the block #n is not the block which is first transferred, the start address is obtained on the basis of the address of the previous transferred block. The transfer length to the delimiter of the block #n is obtained from, for example, the transfer length derived in step S33.

The transfer of the block #n is started by the transfer start command issued from the CPU 20 and the data of the block #n is transferred from the host computer 1 to the tape streamer 3 through the SCSI cable 2. The transferred data is stored into a predetermined address in the memory 14 through the SCSI controller 11, data compressing controller ALDC 12, and address controller ADC 13.

When a message indicative of the completion of the transfer of the block #n is notified from the address controller ADC 13 to the CPU 20 (step S35), an address in which the block subsequent to the block #n is started on the memory 14 and a padding data length of the transfer length up to the end of the block #n are set into the address controller ADC 13 by the CPU 20 in step S36. A transfer start command is issued from the CPU 20.

When the message indicative of the completion of the transfer of the block #n is notified from the address controller ADC 13 to the CPU 20 (step S37), an address where the next block #(n+1) is written on the memory 14 is obtained by the CPU 20 in step S38. In next step S39, the address obtained in step S38 and 4 bytes corresponding to the block size data are set into the address controller ADC 13. The transfer start command is issued from the CPU 20. Thus, the block size data is written into the memory 14.

When a message indicative of the completion of the transfer of the block #(n+1) is notified from the address controller ADC 13 to the CPU 20 (step S40), the block size data written in the memory 14 is read out in next step S41 and a block size of block to be subsequently transferred is obtained. A pointer in the memory 14 of an amount as much as the block size data (4 bytes) is returned by the CPU 20 (step S42). Thus, the next block is written in the memory 14 subsequently to the block written just before.

In next step S43, a check is made to see if all of the transferring processes by the WRITE command have been finished. The size of data to be transferred, namely, a total transfer length is written in the WRITE command. As shown in FIG. 15, the total number (N) of blocks which are transferred has been stored at the end of the data. The above discrimination is made by using the total transfer length and the total number (N) of blocks as transfer end conditions. If there is a block which is not yet transferred, the processing routine is returned to step S34.

Figure 17:
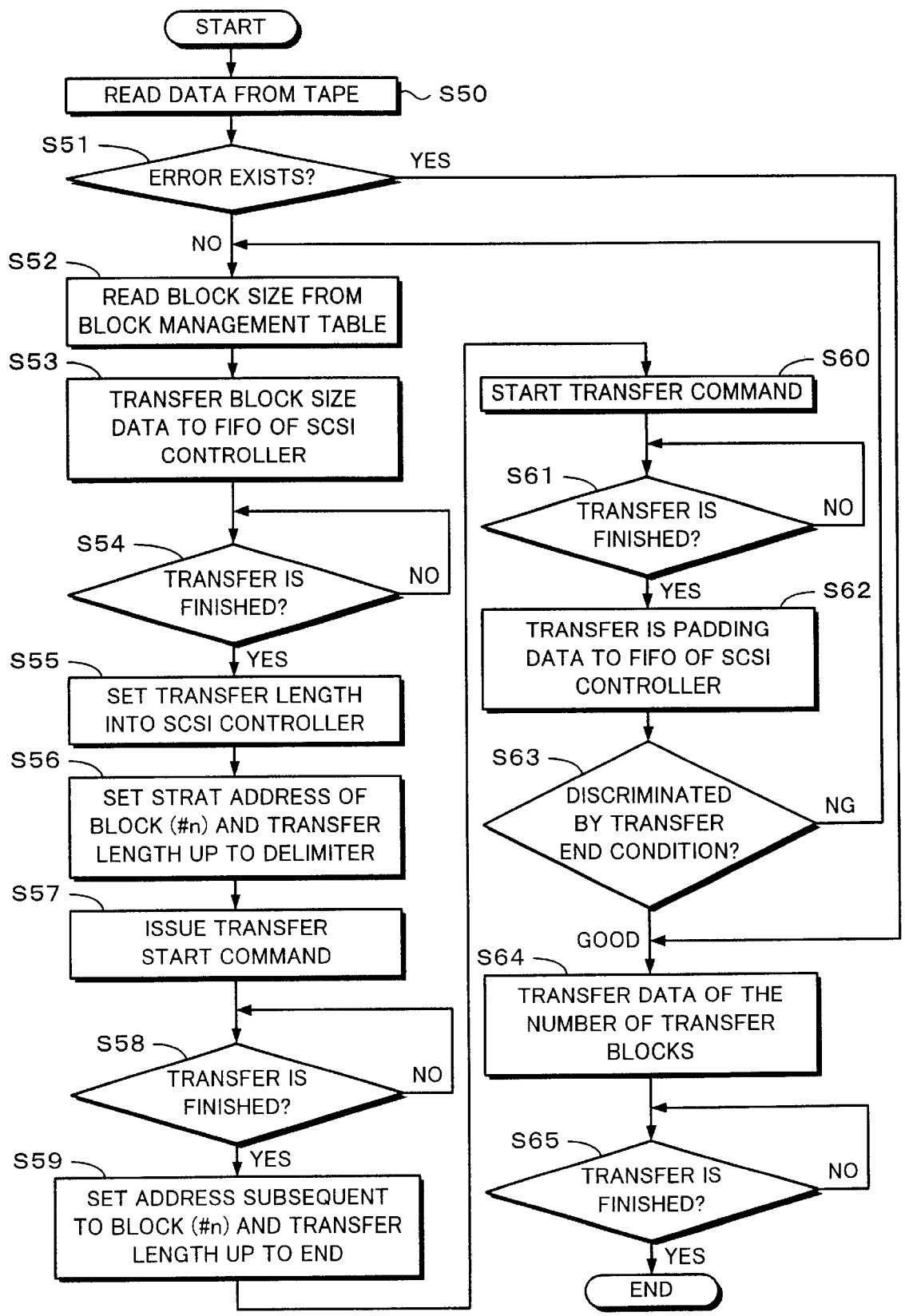
FIG. 17 is a flowchart showing a data reading process from the tape streamer according to the second embodiment.

The reading operation of the data from the tape streamer 3 will now be described. In the second embodiment, the same data structure as that in the writing is used in the reading as well. FIG. 17 is a flowchart showing a data reading process in the tape streamer 3.

Prior to executing the flowchart, information of the loaded tape is requested from the host computer 1 to the tape streamer 3. In the tape streamer 3, a management table at the head of the tape is read and information of a file written on the tape is transferred to the host computer 1. In the host computer 1, on the basis of this information, the READ command to designate the data to be read out from the tape streamer 3 is issued. The READ command is transferred to the SCSI controller 11 of the tape streamer 3 through the SCSI cable 2 and is sent from the SCSI controller 11 to the CPU 20.

In first step S50, the data is read out from the magnetic tape 18 by the control of the CPU 20 based on the READ command. The read-out data is supplied to the ECC encoder/decoder 15 through the equalizer 16 and an error correcting process is executed by a predetermined method. At this time, when an uncorrectable error exists in the data, the processing routine is jumped to step S64, which will be explained hereinlater (step S51). In step S64, for example, the number of transferred blocks is set to "0" and the processes are finished.

When there is no error in step S51, the error corrected data is written from a predetermined address in the memory 14 by a recording image on the tape through the address controller ADC 13. In next step S52, the block management table is read out from the memory 14 by the CPU 20 and the block size of the block to be transferred is obtained. The block size data indicative of the block size is transferred to the FIFO 111 built in the SCSI controller 11 (step S53)

When the transfer of the block size data is finished (step S54), the transferred block size is set as a transfer length into the register of the SCSI controller 11 by the CPU 20 in step S55.

In next step S56, a start address of the block #n as a transfer block written in the memory 14 and the transfer length to the delimiter of the block #n are set into the address controller ADC 13 by the CPU 20. In step S57, the transfer start command is issued from the CPU 20 to the address controller ADC 13.

On the basis of this command, the data of an amount corresponding to only the length designated by the transfer length is read out from the start address of the block #n in the memory 14. The read-out data is supplied to the SCSI controller 11 through the address controller ADC 13 and data compressing controller ALDC 12. In the SCSI controller 11, a control and the like of the SCSI bus are executed and the block #n is transferred from the terminal 10 to the host computer 1 through the SCSI cable 2.

When the transfer is finished (step S58), in next step S59, an address where the block next to the block #n starts in the memory 14 is set into the address controller ADC 13 by the CPU 20 and the length to the end of the block #n is set as a transfer length. In step S60, the transfer start command is issued and the transfer is started.

When the transfer is finished (step S61), the processing routine advances to step S62 and the padding data is transferred to the built-in FIFO 111 of the SCSI controller 11 by the CPU 20.

In next step S63, a check is made to see if all of the transferring processes by the READ command have been finished. The size of data to be transferred, namely, the total transfer length has been written in the READ command. As shown in FIG. 15, the total number (N) of blocks to be transferred has been stored at the end of the data. This discrimination is made by using the total transfer length and the total number (N) of blocks as transfer end conditions. If there is a block which is not yet transferred, the processing routine is returned to step S52.

When it is determined in step S63 that the transfer has been finished, the processing routine advances to step S64. The number (N) of transferred blocks is transferred to the built-in FIFO 111 of the SCSI controller 11 by the CPU 20. A series of processes is finished after waiting for the end of the transfer in step S65.

The third embodiment of the invention will now be described. In the third embodiment of the invention, by inserting data of one byte showing an attribute into the block table of the first embodiment of the invention, even if data comprising a hierarchy of the block, file, set, volume, physical device, and storage system is continuously recorded, each boundary of the block, file, set, volume, and physical device of each hierarchy can be identified upon reproduction.

Figure 18:
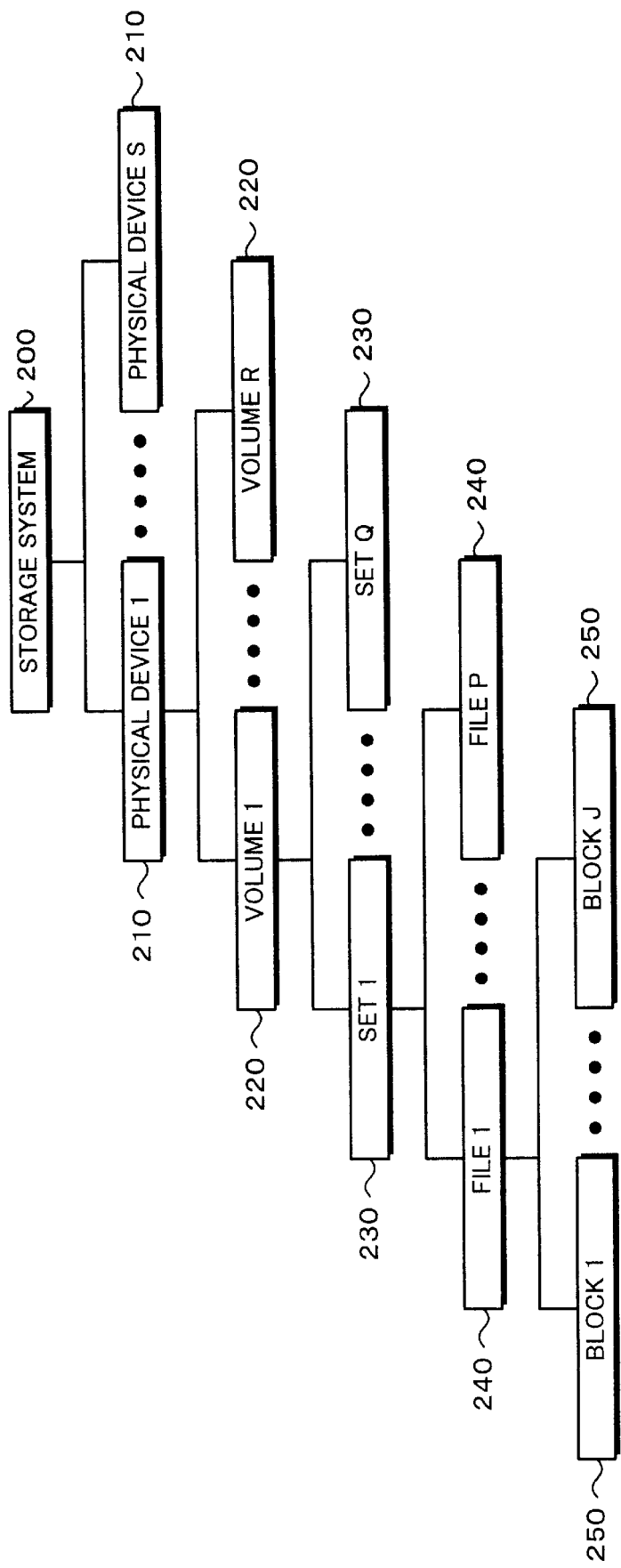
FIG. 18 is a schematic diagram for explaining a hierarchy relation of a block, a file, a set, a volume, a physical device, and a storage system.

FIG. 18 shows relations among the block, file, set (directory), volume, physical device, and storage system. A storage system 200 has one or more physical devices 210. The physical device is a hard disk, a floppy disk, an optical disk, or the like. Each physical device 210 has one or more volumes 220. Each volume 220 has one or more sets 230. Further, each set 230 has one or more files 240. Further, each file 240 has one or more blocks 250.

As mentioned above, the block, file, set, volume, physical device, and storage system mutually have hierarchy relations.

A construction of the block table according to the third embodiment of the invention will now be described in detail with reference to FIG. 19. FIG. 19 shows an example of a block table which is formed when writing according to the third embodiment of the invention. As shown in FIG. 19, the number (N) of blocks to be transferred is shown by the first four bytes.

Data of one byte indicative of the attribute and data showing a length of the ith block (i=0, 1, 2, . . . , N) are stored after the data showing the number (N) of blocks. The data showing the attribute consists of 8 bits and a file mark, a set mark, a volume mark, and a physical device mark are shown by a value of such data.

As shown in FIG. 19, data showing a length of the ith block (i=0, 1, 2, . . . , N) is stored subsequently to the data of 1 byte indicative of the attribute. When a boundary of the file, set, volume, or physical device, namely, a delimiter is located at the position of the ith block, the data showing the length of the ith block is set to [0] and which one of the boundaries of the file, set, volume, and physical device such a boundary indicates is shown by the data of 1 byte indicative of the attribute.

For example, when the value of the attribute data of 8 bits is equal to [10000000], it shows the boundary of the file. When the value of the attribute data of 8 bits is equal to [01000000], it shows the boundary of the set. When the value of the attribute data of 8 bits is equal to [00100000], it shows the boundary of the volume. When the value of the attribute data of 8 bits is equal to [00010000], it shows the boundary of the physical device. Further, when the boundary is none of them, the value of the attribute data of 8 bits is set to [00000000].

The data of one byte showing the attribute and the data showing the length of the ith block as many as only the number (N) of blocks are stored into the block table.

As mentioned above, since the attribute data indicative of the presence or absence of each boundary of the file, set, volume, and physical device is provided in the block table, even if the data comprising the hierarchy of the block, file, set, volume, physical device, and storage system is continuously recorded, each boundary of the block, file, set, volume, and physical device of each hierarchy can be identified upon reproduction.

The fourth embodiment of the invention will now be described. In the fourth embodiment of the invention, by inserting the data of 1 byte showing the attribute into the block table of the second embodiment of the invention, even if the data comprising the hierarchy of the block, file, set, volume, physical device, and storage system is continuously recorded, each boundary of the block, file, set, volume, and physical device of each hierarchy can be identified upon reproduction.

Since the block, file, set, volume, physical device, and storage system have already been described by using FIG. 18, their descriptions are omitted here.

A construction of the block table according to the fourth embodiment of the invention will now be described in detail. FIG. 20 shows an example of the block table which is formed upon writing according to the fourth embodiment of the invention. As shown in FIG. 20, the data of 8 bits showing the attribute is stored before the data indicative of the length of the ith block (i=1, 2, . . . , N). The data main body of the ith block is stored after the data showing the length of the ith block. The end of the block main body is filled with the [0] data of the necessary number and the zero-padding is performed so as to complete the data main body on a 4-byte unit basis.

In a manner similar to the foregoing third embodiment of the invention, when the boundary of the file, set, volume, or physical device, namely, a delimiter is located at the position of the ith block, the data showing the length of the ith block is set to [0]. By the data of 1 byte showing the attribute, the boundary of which one of the file, set, volume, and physical device such a boundary is is shown.

For example, when the value of the attribute data of 8 bits is equal to [10000000], it shows the boundary of the file. When the value of the attribute data of 8 bits is equal to [01000000], it shows the boundary of the set. When the value of the attribute data of 8 bits is equal to [00100000], it shows the boundary of the volume. When the value of the attribute data of 8 bits is equal to [00010000], it shows the boundary of the physical device. Further, when the boundary is none of them, the value of the attribute data of 8 bits is set to [00000000].

The data of 1 byte showing the attribute, the data indicative of the length of the ith block, and the data main body as many as only the number (N) of blocks are stored into the block table. When the data with respect to all of the blocks to be transferred is stored, the data showing the number (N) of transfer blocks is stored into the last four bytes.

As mentioned above, since the attribute data indicative of the presence or absence of each boundary of the file, set, volume, and physical device is provided in the block table, even if the data comprising the hierarchy of the block, file, set, volume, physical device, and storage system is continuously recorded, each boundary of the block, file, set, volume, and physical device of each hierarchy can be identified upon reproduction.

As mentioned above, according to the third and fourth embodiments of the invention, since the information such as file mark, set mark, volume mark, and physical device mark is preserved on the tape, the data can be reproduced without using any special application software to reconstruct a plurality of files, sets, volumes, and physical devices which were combined in one group.

Although explanation has been made above with respect to the case where the invention is applied to the protocol of the SCSI, the invention is not limited to such an example. For instance, the invention can be also applied to a data transfer protocol such as IPI-3 (Intelligent Peripheral Interface) or the like. The invention is also suitable for use in another protocol such that the overhead between commands is large.

Since the data transferred by the method according to the invention can be also read and written even by an existing device driver because, for instance, the format when the data is written to the tape streamer 3 is similar to the conventional one.

As described above, according to data transfer apparatus, since a plurality of blocks of different sizes can be transferred by issuing the WRITE/READ commands once, there are effects such that the overhead time occurring between commands can be remarkably reduced and a data transfer speed is extremely improved.

Since hardware having the conventional construction is used and processes can be also executed by firmware, there is an effect such that even when the invention is newly applied to the conventional apparatus, the costs hardly rise.

Further, according to the first embodiment, since the structure of block is added to the data in a form of the block table, there is an effect such that after the block table was first transferred to the host computer, the block structure can be analyzed.

Moreover, according to the invention, since a plurality of blocks of different sizes are collected to one large data and transferred, there is an effect such that a use efficiency of the bus is improved. There is also an effect such that another device can use the conventional overhead time.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A data transfer method of transferring digital data, comprising the steps of:

analyzing a plurality of data blocks whose block sizes are not the same so as to obtain a length of each of the data blocks each representative of an actual size of the respective data block;

forming a table having the actual sizes of each of said plurality of blocks; and transferring the table, said plurality of data blocks, and block information pertaining to each of said plurality of data blocks together with said plurality of data blocks;

wherein the steps of analyzing, forming, and transferring are performed in response to a single transfer command.

2. A data transfer method according to claim 1, characterized in that said block information is said block size information of said data block.

3. A data transfer method according to claim 1, characterized in that said block information of said plurality of data blocks is collected into one block information and is transferred as a table.

4. A data transfer method according to claim 1, characterized in that when said plurality of data blocks are transferred, a set comprising the data block and said block information corresponding to said data block is continuously transferred.

5. A data transfer method according to claim 1, characterized in that attribute information indicative of a boundary of at least one of a file, a set, a volume, and a physical device is included in said block information.

6. A data transfer method according to claim 1, in which the table is transferred prior to the transfer of said plurality of data blocks.

7. A data transfer method according to claim 1, in which the table is transferred subsequent to the transfer of said plurality of data blocks.

8. A data transfer apparatus for transferring digital data, comprising:

means for analyzing a plurality of data blocks whose block sizes are not the same so as to obtain a length of each of the data blocks each representative of an actual size of the respective data block;

means for forming a table having the actual sizes of each of said plurality of blocks; and means for transferring the table, said plurality of data blocks and block information pertaining to each of said plurality of data blocks together with said plurality of data blocks;

wherein the analyzing, forming, and transferring are performed in response to a single transfer command.

9. A data transfer apparatus according to claim 8, wherein when said plurality of data blocks are transferred, a set comprising a data block and said block information corresponding to said data block is continuously transferred.

10. A data transfer apparatus according to claim 8, in which the table is transferred prior to the transfer of said plurality of data blocks.

11. A data transfer apparatus according to claim 8, in which the table is transferred subsequent to the transfer of said plurality of data blocks.

12. A data transfer apparatus according to claim 8, wherein said block information includes said block size information of said block data.

13. A data transfer apparatus according to claim 8, wherein said table contains said block information.

14. A data transfer apparatus for transferring digital data, comprising:

means for analyzing a plurality of data blocks whose block sizes are not the same so as to obtain a length of each of the data blocks each representative of an actual size of the respective data block;

means for forming a table having the actual sizes of each of said plurality of blocks; and means for transferring the table, said plurality of data blocks, and block information pertaining to each of said plurality of data blocks together with said plurality of data blocks;

wherein the analyzing, forming, and transferring are performed in response to a single transfer command; and wherein said block information has an attribute information indicative of a boundary of at least one of a file, a set, a volume, and a physical device.

* * * * *